US012328457B2

(12) United States Patent
Ergen (10) Patent No.: US 12,328,457 B2
(45) Date of Patent: Jun. 10, 2025

(54) METHODS AND SYSTEMS FOR DETECTING INTERRUPTIONS WHILE STREAMING MEDIA CONTENT (71) Applicant: DISH Network L.L.C., Englewood, CO (US)

(72) Inventor: Christopher Ergen, Littleton, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 17/894,021

(22) Filed: Aug. 23, 2022

(65) Prior Publication Data
US 2023/0064341 A1 Mar. 2, 2023

Related U.S. Application Data (60) Provisional application No. 63/236,620, filed on Aug. 24, 2021.

(51) Int. Cl.
H04N 21/234 (2011.01)
H04N 21/25 (2011.01)
H04N 21/654 (2011.01)

(52) U.S. Cl.
CPC ..... H04N 21/23424 (2013.01); H04N 21/251 (2013.01); H04N 21/654 (2013.01)

(58) Field of Classification Search
CPC ........... H04N 21/23424; H04N 21/251; H04N 21/654; H04N 21/44016; H04N 21/4532; H04N 21/4622; H04N 21/4882; H04N 21/812
See application file for complete search history.

(56) References Cited

U.S. PATENT DOCUMENTS

| | | | |
|---|---|---|---|
| 7,992,175 B2 * | 8/2011 | Kahn | H04N 21/631 725/100 |
| 9,491,504 B1 * | 11/2016 | Nijim | H04N 21/4383 |
| 2004/0189873 A1 * | 9/2004 | Konig | H04N 7/162 348/E7.06 |
| 2004/0228615 A1 * | 11/2004 | Schultz | H04N 21/812 386/E5.042 |
| 2013/0347029 A1 * | 12/2013 | Tang | H04N 21/43 725/32 |
| 2014/0282759 A1 * | 9/2014 | Harvey | H04N 21/4668 725/89 |

(Continued)

Primary Examiner — Timothy R Newlin
(74) Attorney, Agent, or Firm — Perkins Coie LLP (57) ABSTRACT A technique is directed to methods and systems for detecting interruptions while streaming media content. An interruption detection system can monitor streaming media content to detect when an interruption (e.g., commercial break, advertisement, etc.) will occur in the streaming content. The interruption detection system can query the content delivery platform to determine whether the same content is available on another channel. When the same video content is available on another channel, the interruption detection system can switch to the second channel when the interruption begins and continue to stream the media content for the user. The interruption detection system can detect when the interruption is ending on the first channel and notify the user of the amount of time until the interruption is complete. When the commercial is complete, the interruption detection system can switch back to the original channel.

17 Claims, 8 Drawing Sheets (56) References Cited

U.S. PATENT DOCUMENTS

| | | | | |
|---|---|---|---|---|
| 2015/0074713 A1* | 3/2015 | Karaoguz | ........ | H04N 21/23106 |
| | | | | 725/32 |
| 2015/0156556 A1* | 6/2015 | Lemmons | ............ | H04L 45/123 |
| | | | | 725/116 |
| 2015/0326814 A1* | 11/2015 | Stephens | ............ | H04N 21/4316 |
| | | | | 725/32 |
| 2016/0345065 A1* | 11/2016 | Vytheeswaran | ...... | H04N 21/458 |
| 2017/0041670 A1* | 2/2017 | Gopalan | ............ | H04N 21/4302 |
| 2017/0118526 A1* | 4/2017 | Tanji | .................... | H04N 21/812 |
| 2018/0160195 A1* | 6/2018 | Redmond | ........... | G06Q 30/0251 |
| 2018/0184152 A1* | 6/2018 | Kirkpatrick | ...... | H04N 21/43637 |
| 2018/0278999 A1* | 9/2018 | David | .............. | H04N 21/42203 |
| 2019/0208263 A1* | 7/2019 | Chamberlin | ....... | H04N 21/4622 |
| 2019/0373337 A1* | 12/2019 | Martell | ................ | H04N 21/475 |
| 2020/0053430 A1* | 2/2020 | Burke | ............. | H04N 21/47217 |
| 2021/0250651 A1* | 8/2021 | Kim | ................... | H04N 21/4532 |
| 2021/0392393 A1* | 12/2021 | Olsson | .............. | H04N 21/4331 |
| 2021/0409822 A1* | 12/2021 | Aher | ................ | H04N 21/47217 |
| 2022/0060762 A1* | 2/2022 | Leaf | ................. | H04N 21/23424 |
| 2022/0272397 A1* | 8/2022 | Sturm | ................ | H04N 21/2402 |
| 2022/0400308 A1* | 12/2022 | Aher | ................... | H04N 21/4667 |
| 2023/0328856 A1* | 10/2023 | Beaumier | ............. | G07F 17/305 |
| | | | | 715/716 |

* cited by examiner

METHODS AND SYSTEMS FOR DETECTING INTERRUPTIONS WHILE STREAMING MEDIA CONTENT

CROSS-REFERENCE TO RELATED APPLICATION

This application claims priority to U.S. Provisional Patent Application No. 63/236,620, filed on Aug. 24, 2021, entitled "METHODS AND SYSTEMS FOR DETECTING INTERRUPTIONS WHILE STREAMING MEDIA CONTENT," incorporated herein by reference in its entirety.

BACKGROUND

Subscribers can stream media content such as sporting events, television shows, movies, music, or videos on devices. Some video content providers interrupt the video content by inserting advertisements or commercials throughout the media content. Subscribers can become irritated by the interruptions in the media content as these interruptions can disrupt the subscriber's concentration and remain on for minutes at a time.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for detecting interruptions while streaming media content. When a user streams media content (e.g., sporting events, news, television shows, movies, or videos) on a device, the video content is periodically interrupted by commercials or advertisements. For example, during the streaming of a sports game, commercials are inserted between plays in the game. When a user streams a television show or movie, often times the television show or movie is periodically interrupted with commercials or advertisements. The interruptions can disrupt the viewing experience for the user, as the interruptions can occur frequently or during interesting moments in the media content. Often, users do not want to watch the advertisements or commercials and change the channel to watch other content during the commercials or advertisements. However, by switching channels, the user is unaware when the commercials or advertisements are complete, and the user may miss parts of the media content by switching back after the content has already began to play again after the commercial.

In a preferred embodiment, an interruption detection system monitors a streaming media content, such as video content or music content, to detect when an interruption (e.g., commercial break, advertisement, etc.) will occur in the streaming content. The interruption detection system can query the content delivery platform for the content on another channel and switch to the other channel when the commercial begins. For example, when a user is streaming video content, such as a sporting event, on a channel on a video delivery platform, the interruption detection system can detect the video content will be interrupted in an amount of time (e.g., any amount of time such as seconds, minutes, etc.) by a commercial break. The interruption detection system determines the same video content is available on a second channel on the video delivery platform, and switches to the second channel when the interruption begins. The interruption detection system can detect when the interruption is ending on the first channel and notify the user of the amount of time until the interruption is complete. The interruption detection system can switch from the second channel to the first channel when the interruption is complete or continue to stream the media content from the second channel.

In another embodiment, the interruption detection system detects the interruption approaching in the content and queries the content delivery platform for the same content on another channel and determines that the content is unavailable on another channel on the content delivery platform. The interruption detection system can query a second content delivery platform (e.g., an internet streaming platform) to determine whether the same content is available on the second content delivery platform and if available switch to the second content delivery platform when the interruption begins. The interruption detection system can detect when the interruption is ending on the first content delivery platform and notify the user of the amount of time until the interruption is complete. The interruption detection system can switch from the second content delivery platform to the first content delivery platform when the interruption is complete or continue to stream the content from the second content delivery platform.

In another embodiment, the interruption detection system detects the interruption in the content and queries the content delivery platform and other content delivery platforms for the same content. The interruption detection system can determine that the content is unavailable on the content delivery platform and other content delivery platforms. When the same content is unavailable, the interruption detection system can query the content delivery platform or other content delivery platforms for content that is similar to the original content based on machine learning techniques using the user's profile or viewing history. For example, if a particular football game is unavailable on other channels or internet streaming, the interruption detection system can select a related sporting event, such as a basketball game, based on machine learning using the user's viewing history of sporting events.

In existing interruption detection systems, the systems detect a commercial break while streaming a video and switch to similar content at the commercial break. In the present embodiments, the interruption detection system detects the commercial break and switches to the same content on another channel or the same content provided by another content provider (e.g., broadcast to internet, satellite to broadcast, satellite to internet, internet to broadcast, broadcast to a prerecorded source, such as DVR, etc.). For example, the present interruption detection system, detects the commercial break and switches the content-delivery source to the same program on another channel or source, and picks up the program at the same location as was left off when the commercial break began. Thus, the present embodiment reduces interruptions for users streaming content.

Figure 1:
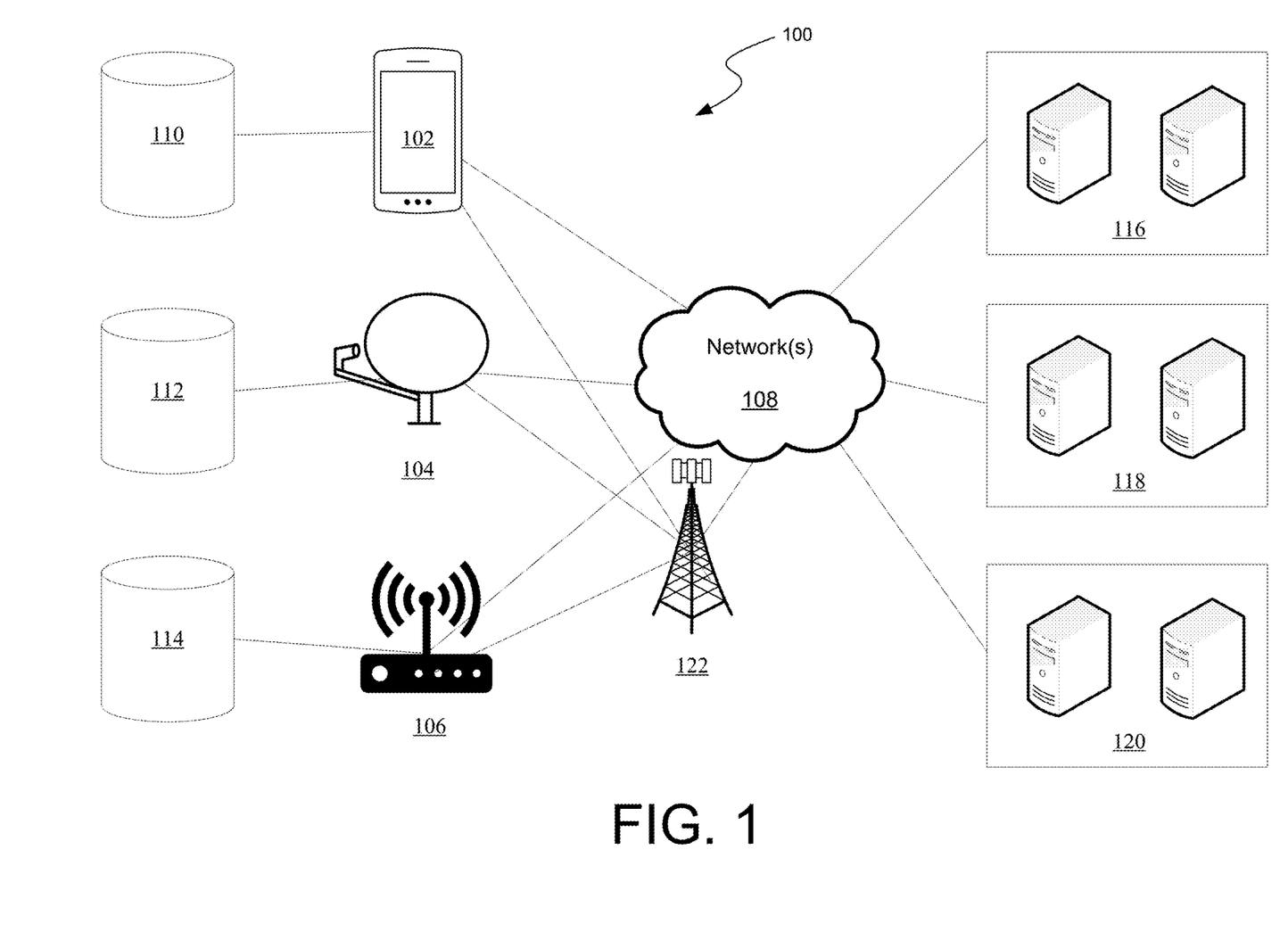
FIG. 1 illustrates an example of a distributed system for detecting interruptions while streaming media content.

FIG. 1 illustrates an example of a distributed system for detecting interruptions while streaming media content. Example system 100 presented is a combination of interdependent components that interact to form an integrated whole for detecting interruptions while streaming media content. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to stream media content and identify interruptions in the content. In one example, a client device 102 may be a mobile phone, a client device 104 may be a smart OTA antenna, and a client device 106 may be a broadcast module box (e.g., set-top box). Other possible client devices include but are not limited to tablets, personal computers, televisions, etc. In aspects, a client device, such as client devices 102, 104, and 106, may have access to one or more data sources and/or databases comprising types of interruption in content or information describing the location of the interruptions in content. In other aspects, client devices 102, 104, and 106, may be equipped to receive live interruption data. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as television (or a television that may have set-top box circuitry built into the television mainframe).

Client devices 102, 104, and 106 may be configured to run software that allows for the simultaneous streaming of content and the detection of interruptions in the content that may be stored locally on the client device or run remotely via network(s) 108. For example, a client device may receive a signal from broadcast tower 122 containing the media content. The signal may indicate the location of the interruption in the content. The client device may receive this interruption data and subsequently store this data locally in databases 110, 112, and/or 114. In alternative scenarios, the interruption data may be transmitted from a client device (e.g., client device 102, 104, and/or 106) via network(s) 108 to be stored remotely on server(s) 116, 118, and/or 120. A user may subsequently access the interruption data from a local database (110, 112, and/or 114) and/or external database (116, 118, and/or 120), depending on where the interruption data may be stored. The system may be configured to receive and process interruption data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check the interruption data from a channel from an OTA antenna (e.g., antenna 104). A graphic user interface may display on the mobile device 102 indicating the interruptions of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in determining the interruptions in the media content. Such databases may contain certain interruption data such as commercial break lengths, location of the commercials, repetition of commercials, etc. Such data may be transmitted via network(s) 108 to client devices 102, 104, and/or 106 to assist in determining when the interruptions will occur. Because broadcast tower 122 and network(s) 108 are configured to communicate with one another, the systems and methods described herein may be able to assess when the interruptions occur while streaming media content.

Figure 2:
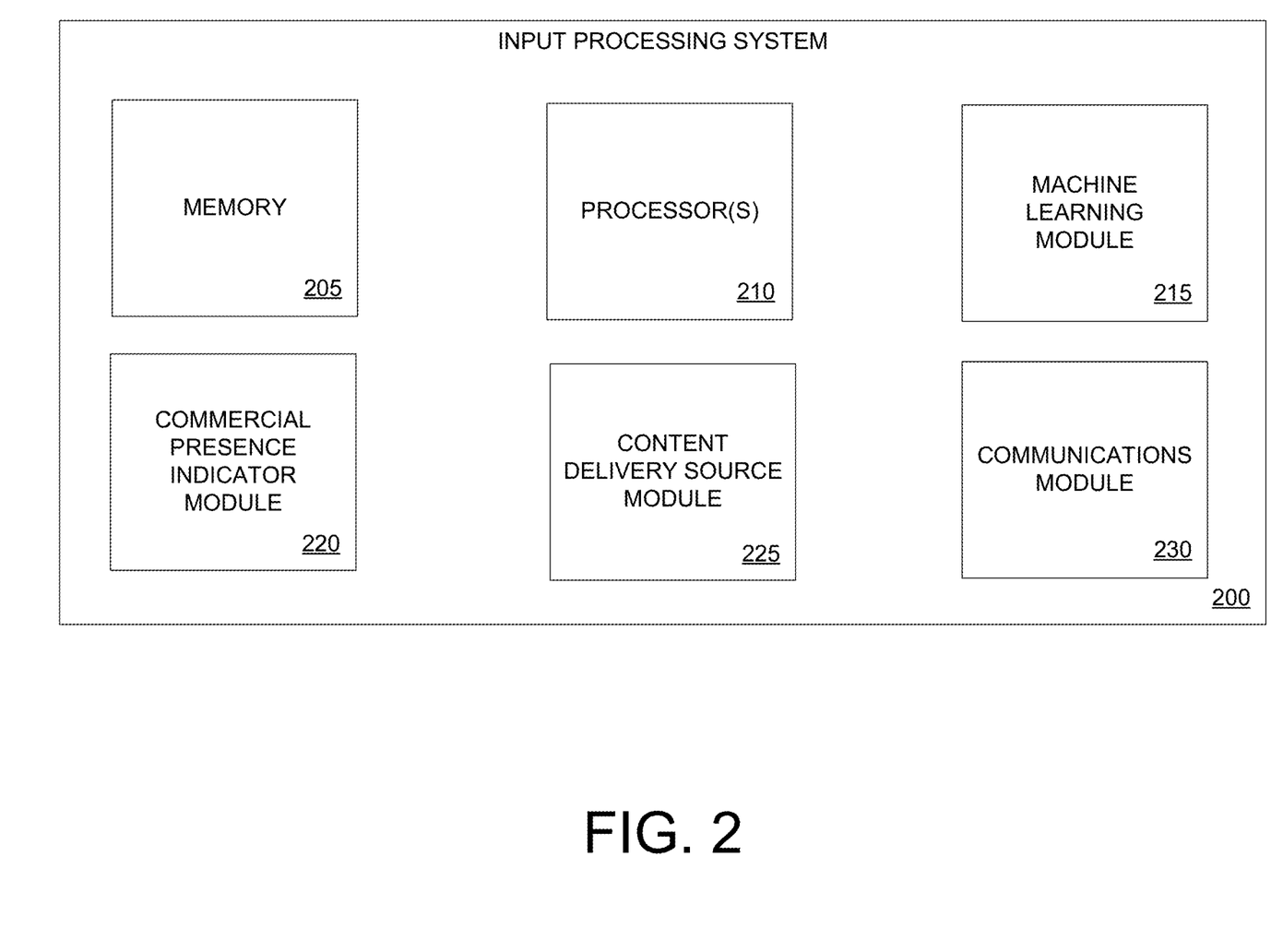
FIG. 2 illustrates an example input processing system for implementing systems and methods for detecting interruptions while streaming media content.

FIG. 2 illustrates an example input processing system for implementing systems and methods for detecting interruptions while streaming media content. The input processing system (e.g., one or more data processors) is capable of executing algorithms, software routines, and/or instructions based on processing data provided by a variety of sources related to detecting when an interruption will occur in media content. The input processing system can be a general-purpose computer or a dedicated, special-purpose computer. According to the embodiments shown in FIG. 2, the disclosed system can include memory 205, one or more processors 210, machine learning module 215, commercial presence indicator module 220, content delivery source module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, commercial presence indicator module 220, content delivery source module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing interruption information such as commercial break and advertisement data.

Machine learning module 215 may be configured to analyze user history of streaming content to determine similar content to present to the user during commercial breaks. The machine learning module 215 may be configured to identify similar content based on at least one machine-learning algorithm trained on at least one dataset reflecting a user's multimedia viewing preferences. The at least one machine-learning algorithms (and models) may be stored locally at databases and/or externally at databases. Client devices may be equipped to access these machine learning algorithms and intelligently select particular media content to display to the user based on at least one machine-learning model that is trained on a user's historical viewing history. For example, if a user frequently watches football sporting events, the user's viewing history may be collected to train a machine-learning model to then automatically show football sporting events during commercials. In other example aspects, a user may demonstrate a preference for certain sports, movies, genres, actors, time periods, geographies, etc.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user viewing history and other data stores of user preferences (e.g., social media profiles) to determine which multimedia content should be automatically shown, or, in some examples, suggested to the user for viewing. Determining whether a certain multimedia item should be displayed may comprise identifying various characteristics of a user's viewing history and preferences. For instance, if a user has a social media profile that displays several photographs of the user engaging in sports, then the interruption detection system described herein may determine that certain program from sports channels (e.g., ESPN) should be displayed during commercial breaks. Similarly, if a user posts certain social media items reflecting a favorite sports team, the interruption detection system may determine that games in which that specific team is playing should be shown. Based on an aggregation of data from a user's viewing history, social media profiles, and other user data stores, at least one ML model may be trained and subsequently deployed to automatically display and/or suggest for media content that a particular user may enjoy viewing at a later time. The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with multimedia information and channel guides. In such examples, the ML model may be locally cached by the client device.

Commercial presence indicator module 220 is configured to analyze media content to identify a commercial (interruption) and indicate when the commercial is starting, the duration of the commercial, and when the commercial is ending. The commercial presence indicator module can identify an approaching commercial break based on indications in a progress bar, stoppage in play at a sporting event, or by a commercial schedule. The commercial presence indicator module 220 can display a notification of the remaining amount of time until the commercial is complete. Content delivery source module 225 is configured to manage which source (e.g., content delivery platform) will play content during the commercial break. For example, when the commercial presence indicator indicates a commercial, content delivery source module 225 switches sources to continue to stream the same media content or relevant media content. When the commercial presence indicator indicates a commercial is complete, then then content delivery source module 225 switches back to the original source.

Communications module 230 is associated with sending/receiving information (e.g., interruption information from machine learning module 215, commercial presence indicator module 220, and content delivery source module 225) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 225 sends information identified by the commercial presence indicator module 220 and information delivered by the content delivery source module 225. Furthermore, communications module 225 may be configured to communicate a interruption data to a client device and/or OTA box, smart OTA antenna, and/or smart TV, etc. to indicate when a commercial begins, the duration of the commercial, and when the commercial ends.

Those skilled in the art will appreciate that the components illustrated in FIGS. 1-2 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 3:
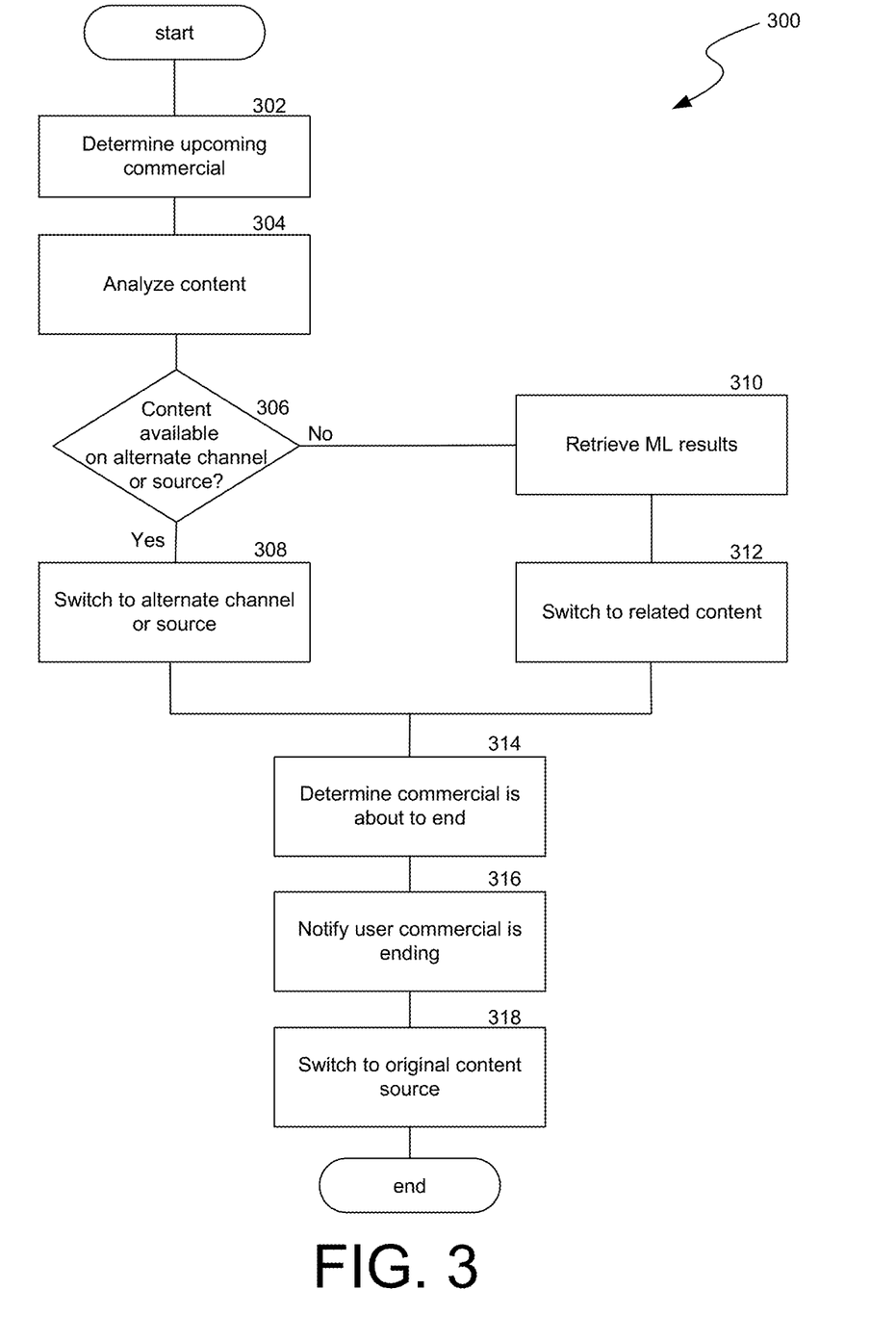
FIG. 3 is a flow diagram illustrating a process used in some implementations for detecting interruptions while streaming media content.

FIG. 3 is a flow diagram illustrating a process 300 used in some implementations for detecting interruptions while streaming media content. In a preferred embodiment, process 300 is triggered by the detection of an interruption (e.g., commercial, advertisement, etc.) to media content, the beginning of an interruption in the media content, a user activating a subscription for interruption detection, powering on a device, streaming of media content, or the user selecting the use of interruption detection. In various implementations, process 300 is performed locally on the user device or performed by cloud-based device(s) that can support detecting interruptions in media content and switching sources (e.g., media-delivery platforms) to provide media content during the interruption. A user can stream media content from various media-delivery platforms, such as local channels or internet streaming. When registering for the detection interruption system, the user can provide access information (e.g., passwords, usernames, etc.) to content provider accounts that the interruption detection system can access for content during commercial breaks. Process 300 can verify whether the user is authorized to access the interruption detection system by verifying access information.

At block 302, process 300 determines that the media content (e.g., video, music, etc.) from the first media-delivery platform will be interrupted by a commercial break. The commercial can be detected based on indications in a media content progress bar, stoppage in play at a sporting event, or by a commercial schedule. In some cases, process 300 can display a notification that the commercial is approaching and request the user indicate whether to stream the commercial break or find alternative media content during the commercial. In some cases, the interruption detection system automatically identifies alternative media content to display during the commercial break. At block 304, process 300 analyses the media content to determine the type of content. For example, process 300 can identify the media content is a sporting event, movie, or television show and any identifying information of the media content, such as title of movie or television show, location of the sporting event, teams participating in the sporting event, etc.

At block 306, process 300 determines whether the same media content is available on another channel of the media-delivery platform or on an alternate media-delivery platform. For example, process 300 can query the media-delivery platform and identify the media content is streaming on another channel. In some cases, process 300 determines the same media content is not available on another channel and queries other media-delivery platforms, such as internet streaming platforms, for the same media content. For example, a user is watching media content (e.g., movie, TV show, etc.) from a satellite television provider, when a commercial is detected, process 300 can analyze internet content providers (e.g., Hulu™, Netflix™, HBO™, XFinity™, etc.) to determine if the media content is available for streaming from the content provider.

At block 308, when the commercial begins, process 300 switches to identified alternate channel of the media-delivery platform or to the alternate media-delivery platform and plays the same media content. Process 300 can align the media content, on the alternate channel or alternate media-delivery platform, with a start of the commercial break. In some cases, process 300 can align the media content on the alternate source with the media content on the original source, so the user has a continuous viewing experience. For example, when the commercial break starts, the user continues at the same location in the movie or TV show from the alternate source, as the location the movie or TV show was at when the commercial began.

Process 300 can determine the same media content is not available on another channel of the media-delivery platform or on an alternate media-delivery platform. At block 310, when the same media content is not available on another channel or source, process 300 can retrieve machine learning results to select media content similar to original media content. For example, the user is watching a football game which is not available on another source, process 300 can switch to a basketball game based on machine learning applied to the user's profile or viewing history. Additional details for machine learning are described in FIG. 4. At block 312, process 300 switches the media content to the similar media content selected by the machine learning. Process 300 can align the similar media content with the start of the commercial break.

Figure 6:
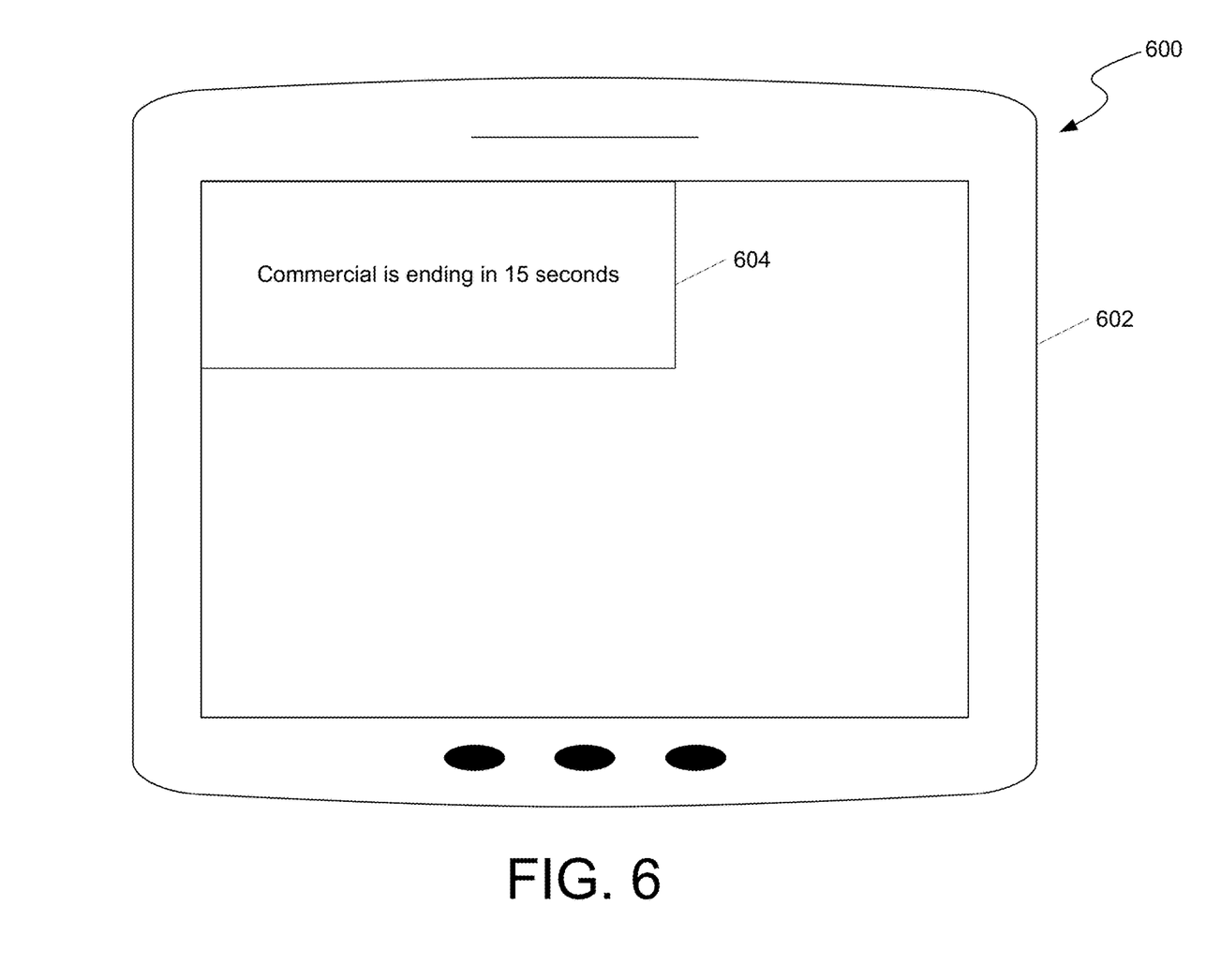
FIG. 6 illustrates an example graphical user interface displaying a user notification.
Figure 7:
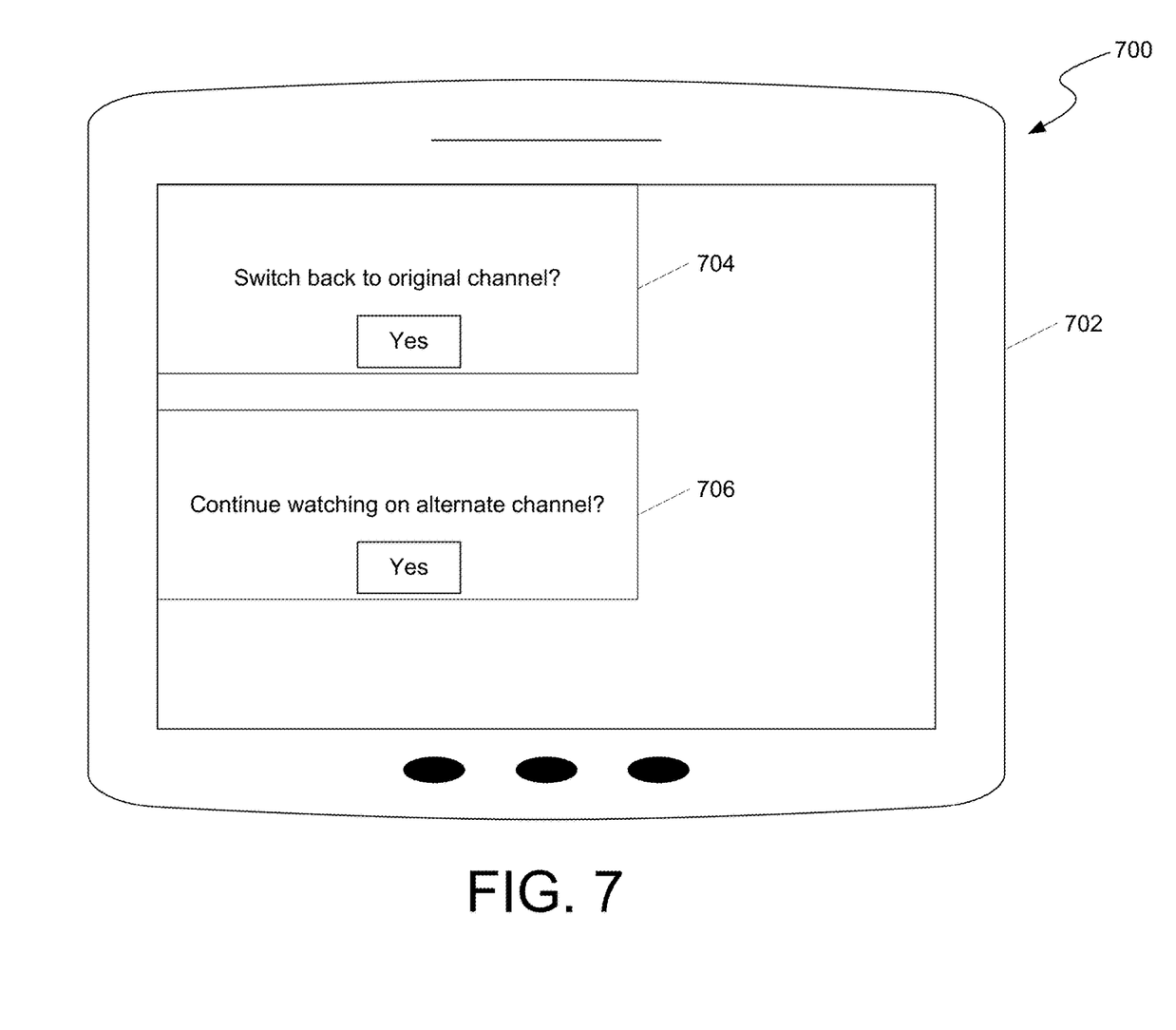
FIG. 7 illustrates an example graphical user interface displaying a user notification.

At block 314, process 300 determines commercial break is about to end. For example, process 300 can detect the commercial break has a threshold of time (e.g., any threshold of time, such as seconds, minutes, etc.) remaining before completing. At block 316, process 300 notifies user the commercial is ending. Process 300 can display an indication of the remaining amount of time before the commercial break completes. For example, as illustrated in example 600 of FIG. 6, notification 604 is displayed on device 602, notifying the user that the commercial break is ending in 15 seconds. In some cases, the notification can inquire if the user wants to continue watching the alternate content or switch back to the original media content from before the commercial. For example, as illustrated in example 700 of FIG. 7, notifications 704 and 706 are displayed on device 702, inquiring if the user would like to switch back to the original channel or continue watching on the alternate channel. At block 318, process 300 switches to the original media content from the original media delivery platform. In some cases, when the same media content is found on the alternate channel or media-delivery platform, process 300 can remain playing the media content from the alternate channel or media-delivery platform and not switchback to the original channel or media delivery platform (e.g., when specified by the user).

Figure 4:
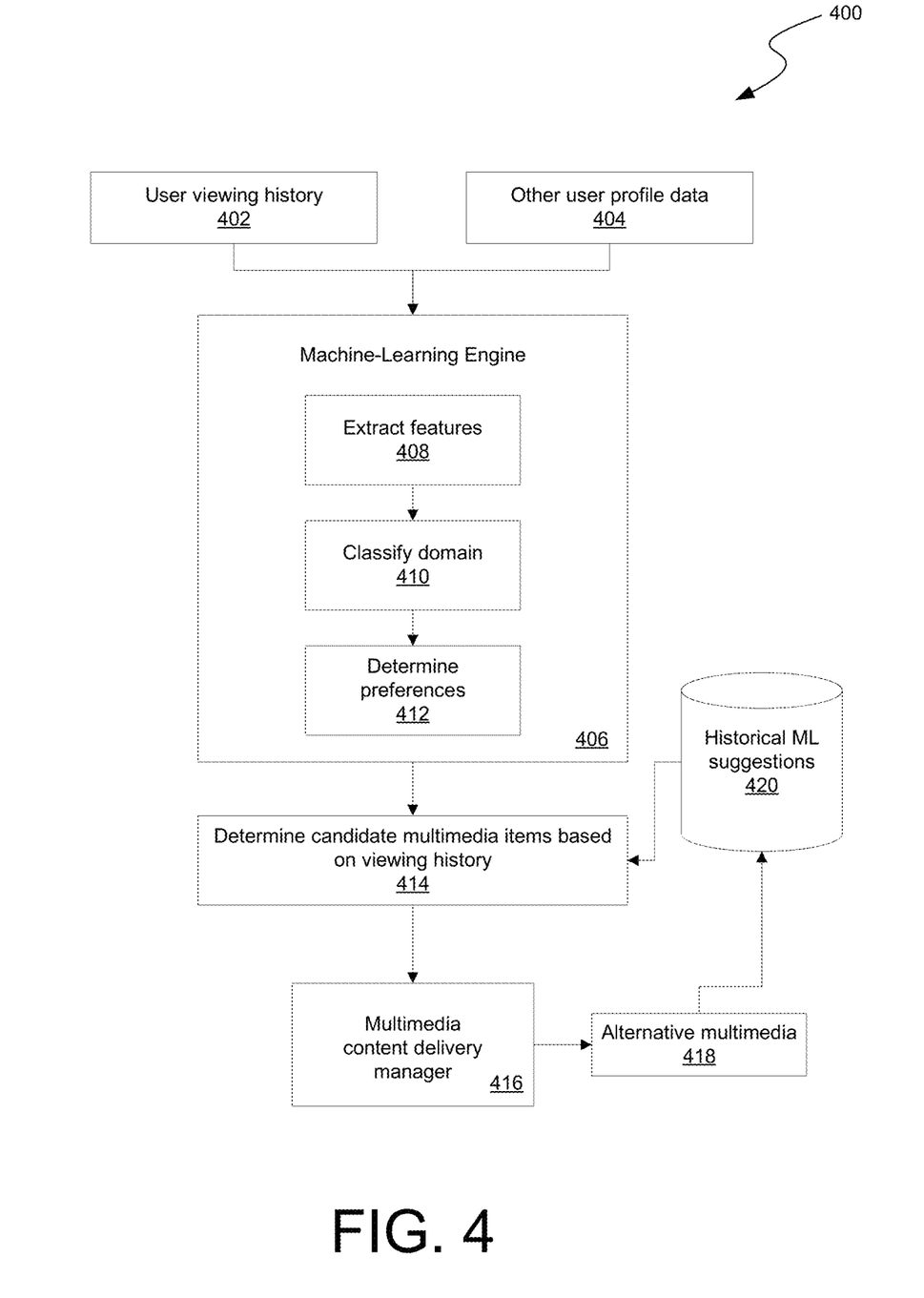
FIG. 4 illustrates an example machine learning system for detecting interruptions while streaming media content, as described herein.

FIG. 4 illustrates an example machine learning system for detecting interruptions while streaming media content, as described herein. FIG. 4 begins at operations 402 and 404, where user viewing history 402 and other user profile data 404 are received by the interruption detection system via a device. The data may be received by a client device and/or a remote web server device. In the instance of a remote web server (such as servers 116, 118, and/or 120), the user viewing history and user profile data may initially be collected from a client device and then transmitted via a wireless network (over network(s) 108) to a remote web server device, where the remote web server device receives the user viewing history and user profile data. The received data may be converted into particular representations that may be understood and processed by a machine utilizing machine-learning algorithms (e.g., ML Engine 406) to intelligently disassemble the user viewing history and other user profile data and identify media content for the user.

The user viewing history 402 and other user profile data 404 may be transmitted to Machine-Learning (ML) Engine 406, where the data may be used to train at least one ML model and/or compared against an already-trained ML model or models. Other user profile data 404 may comprise data from a user's social media account, user responses to a profile survey, and/or data from other sources. In some aspects, the first operation in ML Engine 406 may be extract features 408. At operation 408, certain features may be extracted from the user viewing history data 402 and other user profile data 404, including but not limited to contextual features and lexical features. For instance, the lexical features that may be analyzed include, but are not limited to, word n-grams that may appear in a social media status update, text messages, emails, and/or other text-based medium hosting user profile data. A word n-gram is a contiguous sequence of n words from a given sequence of text. For instance, a particular social media update earlier in the day from the user may state: "The new Avengers movie was awesome!" The word n-gram that may be extracted in this instance is "Avengers movie was awesome." The intelligent interruption detection system now knows that the user enjoyed a movie with an action genre and particular actors and actresses, and therefore, the system may identify future multimedia items that include similar genres and actors/actresses. As should be appreciated, analyzing word n-grams may allow for a deeper understanding of the user and therefore provide more accurate and intelligent multimedia item selection and suggestions for viewing. The machine-learning algorithms from ML Engine 406 may be able to compare thousands of n-grams, lexical features, and contextual features in a matter of seconds to extract the relevant features of a social media, text, and/or email message. Such rapid comparison are impossible to employ manually.

The contextual features that may be analyzed at operation 408 may include, but are not limited to, a top context and an average context. A top context may be a context that is determined by comparing the topics and keywords associated with a particular multimedia item and/or text-based input (e.g., social media update, text message, email, search engine inquiry, etc.) to a set of preloaded contextual cues. An average context may be a context that is determined by comparing the topics and keywords of historically processed text-based input data, historical viewing history, the user's level of enjoyment of historically selected multimedia content, user profile data (E.g., scraped from publicly facing social media websites), and other data. The feature extraction operation 408 may also skip contextually insignificant data when analyzing the input data. For example, a string token in a message input may be associated with articles, such as "a" and "an." Because articles are typically insignificant in the English language the feature extraction operation 408 may ignore these article tokens.

In other examples, the user viewing history 402 may comprise video metadata associated with the past-viewed multimedia items. Such metadata may include but is not limited to: director, writer, actors, actresses, date of release, runtime, genre, MPAA film rating, plot summary and storyline, plot keywords, episode number, series information, and critic reviews and ratings, among other data points. ML Engine 406 may be configured to not only process text-based data, but also process image and video data. At operation 408, features that may be extracted from a multimedia item may include but are not limited to faces, settings, and other objects. Objects may be identified at operation 408 by applying an image recognition algorithm stored within ML Engine 406. The image recognition algorithm may be able to identify objects, such as actors and actresses, geographic locations, settings, and points of interest, among other examples. Similarly, ML Engine 406 may be configured to identify objects in images and multimedia files from a user's social media profile and further determine a user's preferences.

Once the features are extracted at operation 408, the domain of the input data (user viewing history 402 and other user profile data 404) may be classified at operation 410. The features that were extracted at operation 408 may be grouped together into specific classifiers for further analysis at operation 410. Specifically, classifying the domain of the extracted features at operation 410 may utilize statistical models or predefined policies (i.e., prior knowledge, historical datasets) to determine the proper domain of classification. For example, if a user previously watched a Hallmark movie associated with a specific holiday, one of the features that may have been extracted at operation 408 was a holiday object (from the movie title, summary, and/or images of the background environment during the movie, etc.) and/or word n-gram describing "Halloween movies." At operation 410, the particular holiday (e.g., "Halloween") may be associated with a broader domain classification such as a "holiday" domain, in which movies with holiday themes generally may be classified.

At operation 412, the preferences of the user may be determined. For example, historical user viewing history may indicate that the user does not frequently watch romantic comedy movies or television shows, so the interruption detection system described herein may assume that the likelihood of a user wanting to watch a Rom-Com is low. Considering the user profile data 404 and the features extracted at operation 408 (e.g., via public social media postings), however, might reveal that the user is currently dating a person that enjoys romantic comedies. Further, the data extracted from the user profile data indicates that the user and the user's partner may have an upcoming "movie night" date scheduled. As such, the immediate preferences of the user to view a romantic comedy may increase, and the interruption detection system may determine that a Rom-Com movie prior to the "movie night" date is likely preferred by the user.

In other examples, a user may indicate that he/she has a favorite sports team. The ML Engine 406 may determine which team that is based on user viewing history 402 and other user profiled data 404. As a result, the interruption detection system may select to display particular games in which the team is playing, but also television shows/documentaries that may be about that particular sports team (e.g., a highlight reel of the sports team on ESPN). It should be appreciated that multiple preferences may be predicted at operation 412. In other examples, the interruption detection system can indicate the type of the content the user is currently viewing. The ML Engine 406 may determine based on user viewing history 402 and other user profiled data 404, media content that is similar to the media content the user is watching. For example, if the user is viewing a football game, the ML Engine 406 may select other football games to display. As a result, the interruption detection system may select to display particular types of sports games.

After the features are extracted at operation 408, domains classified at operation 410, and preferences determined at operation 412, the system may determine which candidate multimedia items should be displayed at operation 414. Continuing from the earlier "Halloween" example, a user's viewing history may demonstrate that the user has been frequently watching Halloween-themed multimedia. The possible domain classification for a Halloween-themed movie may be "holiday." As such, other multimedia items that are classified as "holiday" domains may be more relevant to the user. Specifically, if the user enjoyed viewing Halloween-themed Hallmark movies around the time of late October, then the interruption detection system may determine that the user is likely to enjoy Christmas-themed Hallmark movies around the time of December, and the system may preemptively display those movies for the user to view during the commercial break.

Additionally, at operation 414, the multimedia items that are ultimately decided to be displayed may be determined using historical selections from the Historical ML suggestions database 420. For instance, certain content that was viewed by the user may be notated in database 420, and content suggestions that were ignored (not viewed) by the user may be notated in database 420, as well. The multimedia items that were viewed and enjoyed by the user may further help determine the candidate multimedia items to be select at step 414.

After candidate multimedia items are selected at operation 414, the method proceeds to multimedia content delivery manager 416, where the candidate multimedia items are identified and determined when to be displayed. For example, multimedia content delivery manager may use the steps from FIG. 2 to determine the length of the interruptions, when the interruption begins, and when the interruption ends. The multimedia content delivery manager 416 determines when the candidate multimedia items selected at step 414 will ultimately be displayed.

Once the alternative multimedia item(s) is selected, by the multimedia content delivery manager 416, to be displayed during the interruption, the alternative multimedia item(s) is displayed for the user to view at step 418. The displayed content is then subsequently stored in Historical ML suggestions database 420 for future reference (e.g., in determining the candidate multimedia items for viewing at step 414). Once a multimedia item is selected and/or displayed, a notification may be provided to the user, requesting feedback of whether the user enjoyed the selection of the alternative multimedia content during the commercial break.

Figure 5:
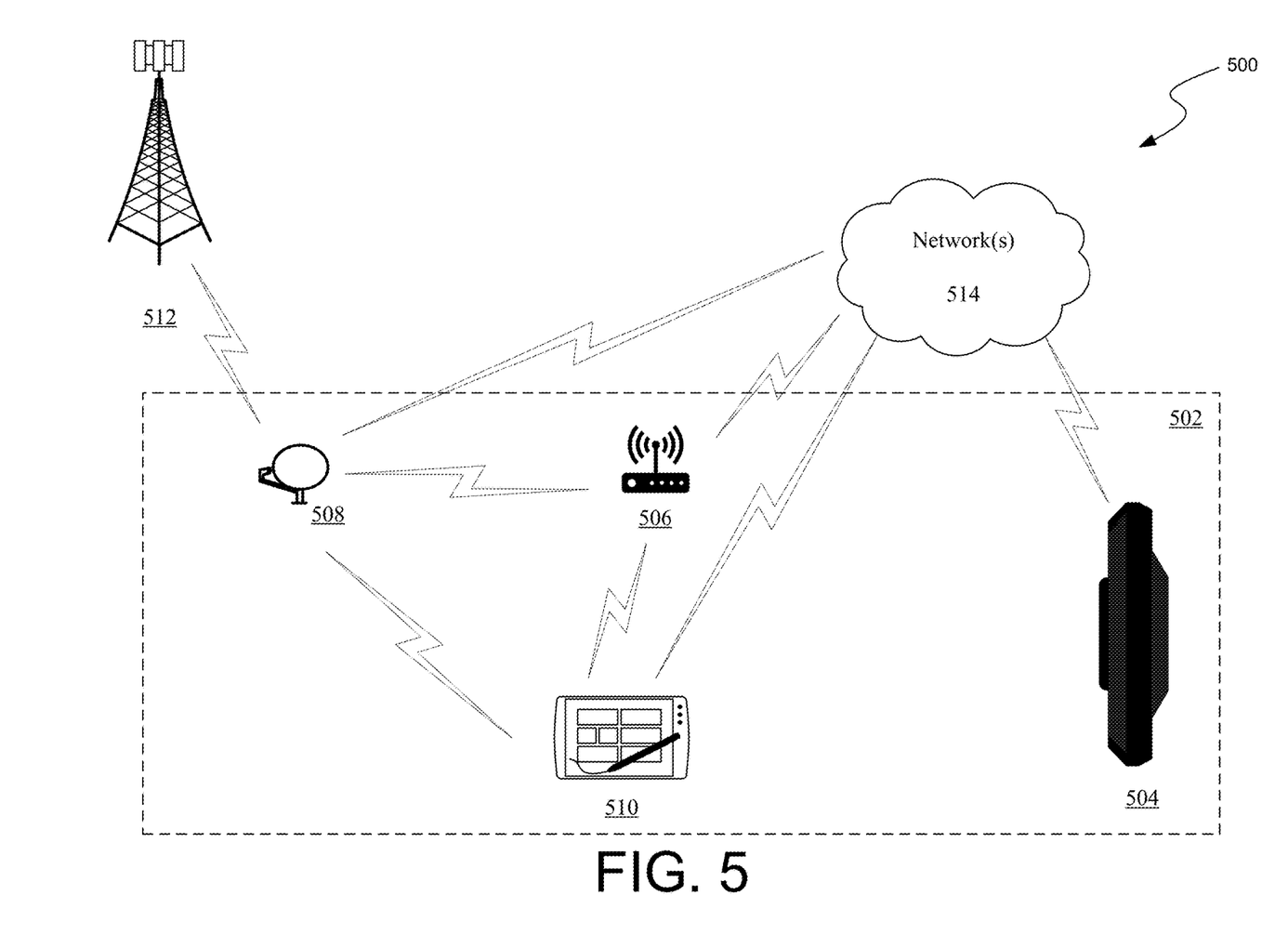
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506, an OTA antenna 508, and a mobile device 510. Each of these devices may be configured to communicate with network(s) 514. Network(s) 514 may be a WiFi network and/or a cellular network. The OTA antenna 508 may also be configured to receive local broadcast signals from local broadcast tower 512 or satellite broadcast tower. In some examples, when switching media content sources during interruptions, the system may use local channels and/or programming with channels and programs offered through streaming services (e.g., Internet-streaming, on-demand, etc.). Such media may be delivered via network(s) 514 rather than local broadcast tower 512 and OTA antenna 508. If a certain user-indicated channel and/or program is also offered via an Internet-streaming service, the system may obtain that content via the Internet-streaming service instead of the OTA service.

Figure 8:
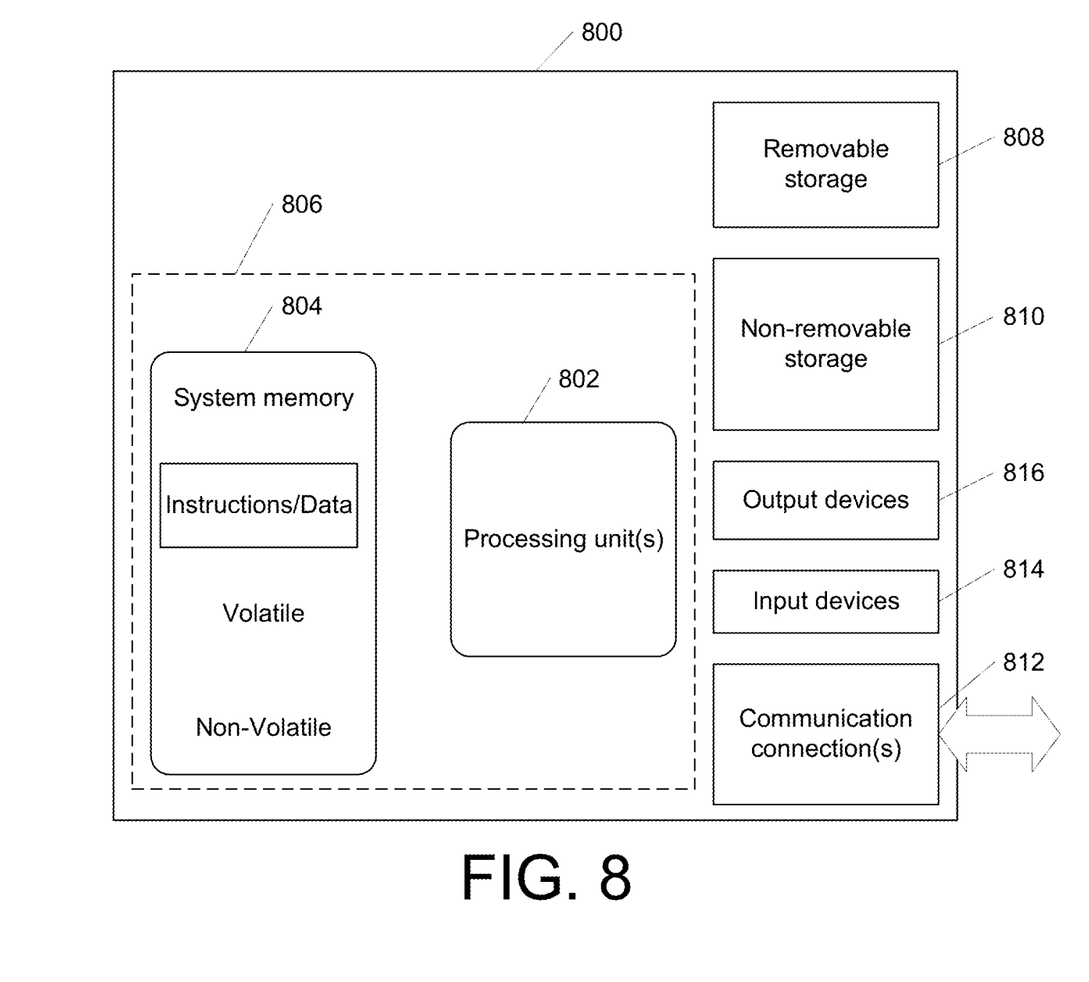
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable 808 and/or non-removable 810) including, but not limited to, magnetic or optical disks or tape. Similarly, environment 800 may also have input device(s) 814 such as keyboard, mouse, pen, voice input, etc., and/or output device(s) 816 such as a display, speakers, printer, etc. Also included in the environment may be one or more communication connections, 812, such as Bluetooth, WiFi, WiMax, LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 800 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method to reduce interruptions while streaming video content, the method comprising:
    displaying first video content from a first video-delivery platform;
    determining that the first video content from the first video-delivery platform will be interrupted by a first commercial break;
    querying the first video-delivery platform for second video content, wherein the second video content is different from advertisement content;
    upon determination that the second video content is available on the first video-delivery platform, aligning the second video content on the first video-delivery platform with a start of the first commercial break;
    displaying the second video content from the first video-delivery platform;
    determining that the second video content from the first video-delivery platform will be interrupted by a second commercial break;
    in response to the determination, querying at least a second video-delivery platform for a third video content, wherein the third video content is different from advertisement content; and
    upon determination that the third video content is available on the second video-delivery platform, aligning the third video content on the second video-delivery platform with a start of the second commercial break on the first video-delivery platform;
    detecting the first commercial break has a threshold of a remaining amount of time before completing;
    displaying an indication of the remaining amount of time before the first commercial break completes; and in response to the first commercial break ending, displaying the first video content from the first video-delivery platform.

2. The method of claim 1, further comprising:
identifying the second video-delivery platform based on determining a video-delivery platform a user is authorized to receive video content on.

3. The method of claim 1, further comprising:
in response to the completing of the first commercial break, switching from the second video-delivery platform to the first video-delivery platform.

4. The method of claim 1, further comprising:
receiving, from a user, a command to switch from the second video-delivery platform to the first video-delivery platform or to remain on the second video-delivery platform.

5. The method of claim 1, wherein the third video content is received from at least one machine-learning algorithm, wherein the at least one machine-learning algorithm is trained based on at least one dataset associated with a past multimedia viewing history.

6. The method of claim 1, wherein the second video-delivery platform comprises an Internet-streaming platform.

7. A computing system comprising:
one or more processors; and
one or more memories storing instructions that, when executed by the one or more processors, cause the computing system to perform a process comprising:
displaying first video content from a first video-delivery platform;
determining that the first video content from the first video-delivery platform will be interrupted by a first commercial break;
querying the first video-delivery platform for second video content, wherein the second video content is different from advertisement content;
upon determination that the second video content is available on the first video-delivery platform, aligning the second video content on the first video-delivery platform with a start of the first commercial break;
displaying the second video content from the first video-delivery platform;
determining that the second video content from the first video-delivery platform will be interrupted by a second commercial break;
in response to the determination, querying at least a second video-delivery platform for a third video content, wherein the third video content is different from advertisement content; and
upon determination that the third video content is available on the second video-delivery platform, aligning the third video content on the second video-delivery platform with a start of the second commercial break on the first video-delivery platform;
detecting the first commercial break has a threshold of a remaining amount of time before completing;
displaying an indication of the remaining amount of time before the first commercial break completes; and
in response to the first commercial break ending, displaying the first video content from the first video-delivery platform.

8. The computing system of claim 7, wherein the process further comprises:
identifying the second video-delivery platform based on determining a video-delivery platform a user is authorized to receive video content on.

9. The computing system of claim 7, wherein the process further comprises:
in response to the completing of the first commercial break, switching from the second video-delivery platform to the first video-delivery platform.

10. The computing system of claim 7, wherein the process further comprises:
receiving, from a user, a command to switch from the second video-delivery platform to the first video-delivery platform or to remain on the second video-delivery platform.

11. The computing system of claim 7, wherein the third video content is received from at least one machine-learning algorithm, wherein the at least one machine-learning algorithm is trained based on at least one dataset associated with a past multimedia viewing history.

12. The computing system of claim 7, wherein the second video-delivery platform comprises an Internet-streaming platform.

13. A non-transitory computer-readable medium storing instructions that, when executed by a computing system, cause the computing system to perform operations to reduce interruptions while streaming video content, the operations comprising:
displaying first video content from a first video-delivery platform;
determining that the first video content from the first video-delivery platform will be interrupted by a first commercial break;
querying the first video-delivery platform for second video content, wherein the second video content is different from advertisement content;
upon determination that the second video content is available on the first video-delivery platform, aligning the second video content on the first video-delivery platform with a start of the first commercial break;
displaying the second video content from the first video-delivery platform;
determining that the second video content from the first video-delivery platform will be interrupted by a second commercial break;
in response to the determination, querying at least a second video-delivery platform for a third video content, wherein the third video content is different from advertisement content; and
upon determination that the third video content is available on the second video-delivery platform, aligning the third video content on the second video-delivery platform with a start of the second commercial break on the first video-delivery platform;
detecting the first commercial break has a threshold of a remaining amount of time before completing;
displaying an indication of the remaining amount of time before the first commercial break completes; and
in response to the first commercial break ending, displaying the first video content from the first video-delivery platform.

14. The non-transitory computer-readable medium of claim 13, wherein the operations further comprise:
identifying the second video-delivery platform based on determining a video-delivery platform a user is authorized to receive video content on.

15. The non-transitory computer-readable medium of claim 13, wherein the operations further comprise:

receiving, from a user, a command to switch from the second video-delivery platform to the first video-delivery platform or to remain on the second video-delivery platform.

16. The non-transitory computer-readable medium of claim 13, wherein the third video content is received from at least one machine-learning algorithm, wherein the at least one machine-learning algorithm is trained based on at least one dataset associated with a past multimedia viewing history.

17. The non-transitory computer-readable medium of claim 13, wherein the second video-delivery platform comprises an Internet-streaming platform.

\* \* \* \* \*